United States Patent [19]

Aebi et al.

[11] Patent Number: 4,940,369
[45] Date of Patent: Jul. 10, 1990

[54] MILLING CUTTER WITH INDEXABLE INSERTS

[75] Inventors: Gilbert Aebi, Trelex; Pierre Raye, Gland, both of Switzerland; Maurice J. A. David, Nantes; Michel E. A. Marianneau, La Montagne, both of France

[73] Assignee: Stellram S.A., Nyon, Switzerland

[21] Appl. No.: 296,742

[22] Filed: Jan. 13, 1989

Related U.S. Application Data

[63] Continuation-in-part of Ser. No. 29,155, Mar. 20, 1987.

[30] Foreign Application Priority Data

Mar. 27, 1986 [CH] Switzerland .................. 01237/86

[51] Int. Cl.$^5$ .................................................. B23C 5/10
[52] U.S. Cl. ................................. 407/42; 407/63; 407/113
[58] Field of Search ................ 407/34, 40, 42, 53, 407/54, 61, 62, 63, 113, 114; 408/713

[56] References Cited

U.S. PATENT DOCUMENTS

| | | | |
|---|---|---|---|
| 1,148,597 | 8/1915 | Lewis | 407/63 |
| 2,188,743 | 1/1940 | Severson | 407/63 |
| 2,212,012 | 8/1940 | Davidson | 407/63 |
| 2,761,196 | 9/1956 | Graves et al. | 407/34 |
| 3,672,017 | 6/1972 | Nielsen et al. | 407/63 |
| 3,725,988 | 4/1973 | Sunderman et al. | 407/63 |
| 3,792,515 | 2/1974 | Lundgren | 407/113 |
| 3,827,119 | 8/1974 | Bennett | 407/113 |
| 4,699,549 | 10/1987 | Shimomura et al. | 407/113 |
| 4,826,363 | 5/1989 | Falchle | 407/63 |

FOREIGN PATENT DOCUMENTS

2164283 3/1986 United Kingdom .................. 407/53

*Primary Examiner*—William Terrell
*Attorney, Agent, or Firm*—Young & Thompson

[57] ABSTRACT

The milling cutter comprises a body (1) having two indentations (4,5) each presenting a housing (4',5') the body of which makes with the longitudinal axis of the body a helix angle which is not equal to zero. In each housing a cutting insert (6,7) is removably fixed which comprises a tip portion emerging on the frontal face (9) of the body and a main cutting edge extending beyond and along the external lateral rim of the indentation. The position and the shape of this insert are such that the radial cutting angle is not equal to zero and is constant, and that the clearance angle is constant with a wedge angle of the insert which is also constant.

9 Claims, 3 Drawing Sheets

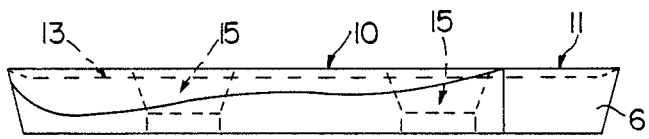
FIG.5
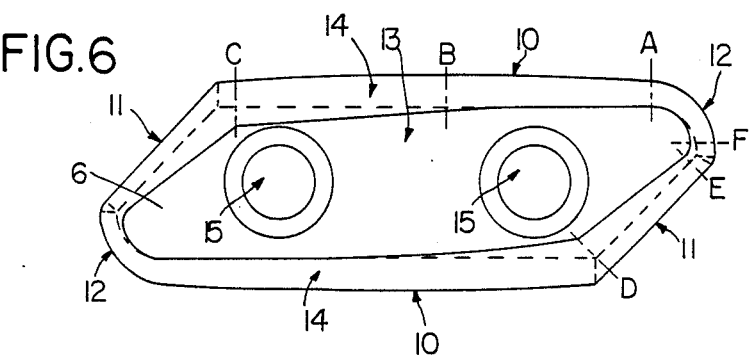
FIG.6
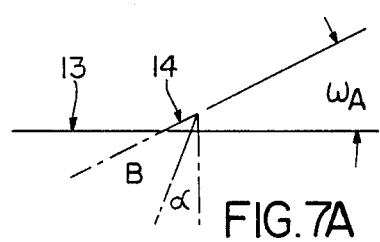
FIG.7A
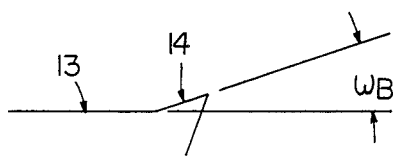
FIG.7B
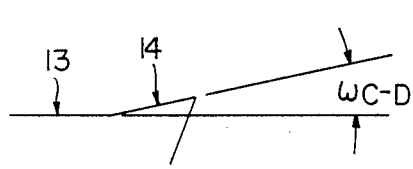
FIG.7C-D
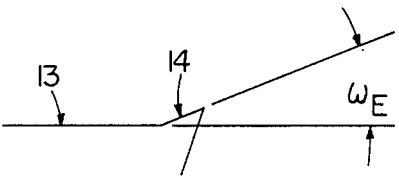
FIG.7E
FIG.7F
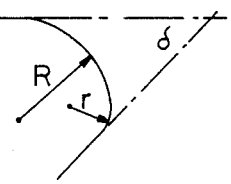
FIG.8A
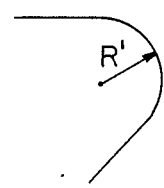
FIG.8B
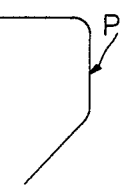
FIG.8C

MILLING CUTTER WITH INDEXABLE INSERTS

This application is a continuation-in-part of our copending application Ser. No. 07/029,155 filed Mar. 20, 1987.

BACKGROUND OF THE INVENTION

The present invention relates to a milling cutter with indexable cutting inserts, called a milling cutter "for pocketing", as well as the cutting inserts intended to be used with this milling cutter. More particularly, this type of milling cutter called "for pocketing" allows, in addition to the usual slotting and contouring, the penetration into the material to be machined by the combination of axial displacement of the cutter and of the movement of the piece along at least one of the axes of the table.

BRIEF DESCRIPTION OF THE PRIOR ART

Helical milling cutters with brazed inserts are already known which present a radial rake, a clearance angle, and a wedge angle which are constant along the whole cutting height, and which are generally used for operation of finishing by contouring, of side milling or of slotting. However, these cutters present the drawback of necessitating grinding operations with decreasing the initial diameter. Furthermore, in case of the accidental breakage of an insert, the repairing of such a cutter is expensive since it necessitates debrazing, brazing and grinding. Finally, it is necessary to have several different milling cutters for the machining of different materials.

SUMMARY OF THE INVENTION

The purpose of this invention is to provide a milling cutter with indexable cutting inserts which obviates the above-mentioned drawbacks of the known helical milling cutters and which are adapted to pocketing works. This purpose is achieved with the milling cutter according to the invention, which is characterized by the fact that it comprises a body having at least two indentations each presenting a housing, the bottom of which makes with the longitudinal axis of the body an axial rake not equal to zero, by the fact that in each housing a cutting insert is removably fixed which comprises a corner portion emerging onto the frontal face of the body and a main cutting edge extending beyond and along the external lateral rim of the indentation, and by the fact that the position and the shape of this insert are such that the radial rake is not equal to zero and constant and that the clearance angle is constant with a wedge angle of the insert also being constant.

Another object of this invention is to provide a cutting insert to be used with the above-defined milling cutter of the invention, and which is characterized by the fact that it shows the general shape of a parallelogram, the two long sides forming two main cutting edges and the two short sides forming two secondary cutting edges, by the fact that the included angle between the main edge and the secondary edge is of 40° to 70°, and by the fact that it comprises a flat central depression connected with the respective main and secondary cutting edges, as well as with the corner portions, by a slope with a variable incline, this incline being such that taking account of the axial rake of the milling cutter, the radial rake of the milling cutter is constant along its whole main cutting edge.

BRIEF DESCRIPTION OF THE FIGURES

The annexed drawing shows schematically and by way of example an embodiment of the milling cutter and of the cutting insert according to the invention.

FIGS. 5 and 6 are a side view and a plan view, respectively, of a cutting insert according to the invention;

FIGS. 7A to 7F are partial section views along lines A to F of FIG. 6;

FIGS. 8A, 8B and 8C are schematic plan views of three variants of the tip portion of a cutting insert according to the invention;

DETAILED DESCRIPTION

Figure 1:
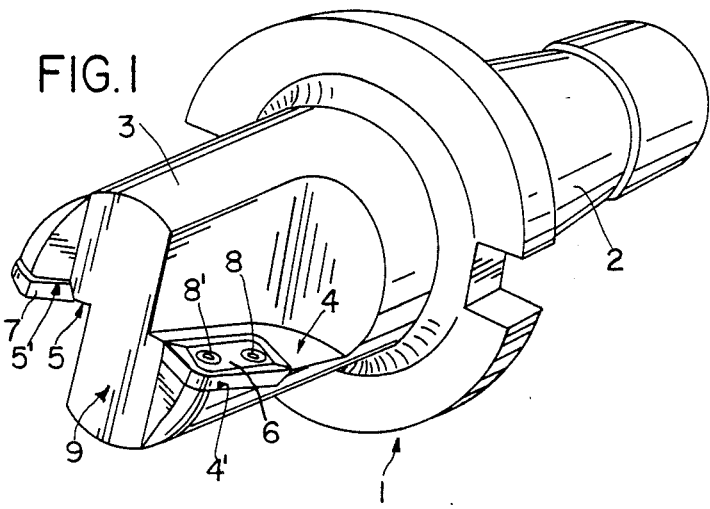
FIG. 1 is a general view in perspective of a milling cutter according to the invention with indexable cutting inserts.

The embodiment of the milling cutter according to the invention, shown by way of example on FIGS. 1 to 4, comprises a body 1 presenting on one side a conical part 2 intended for fastening of this body onto the mandrel of a machine tool, and on the other side a front part 3, which presents two indentations 4, 5 each comprising a housing 4', 5' intended to receive in service position a cutting insert 6, 7.

The bottom of each housing 4', 5' makes with the longitudinal axis a positioning angle corresponding to the axial rake $\gamma_a$ of the insert on the milling cutter which should not be equal to zero and which is generally comprised between 2° and 20°, here for example about 10°. The milling cutter illustrated by way of example only has a diameter of 40 mm, a maximal cutting height of 30 mm and an effective radial cutting angle $\gamma_r$ of about 18°. The axial rake $\gamma_a$ is often referred to as the back rake angle and the radial rake $\gamma_r$ is often referred to as the tool side rake according to International Standard ISO 3002. For other applications, a milling cutter of this type can be foreseen with a cutting height of at least 55 mm and an effective radial rake $\gamma_r$ of 3° to 25°.

Each cutting insert 6, 7 is fixed in a removable manner in the housing 4', 5' provided in each oblique indentation 4, 5, here by means of two screws 8, 8', so that one of these screws 8 tends to push the insert into the angle of the housing and the other one 8', perpendicular to the longitudinal axis of said insert, against the internal lateral wall of the housing.

The front part of the body of the cutter 1 further presents a frontal clearance 9. This clearance is provided in order that it allows a penetration angle $\phi$ into the material to be machined which is comprised between 5° and 30°, here of about 15°. This penetration angle $\phi$ depends on one part on the diameter of the milling cutter and on the other part on the sizes of the cutting insert as well as of the included angle (tip or nose angle) thereof.

FIGS. 5 and 6 illustrate by way of example a cutting insert 6 usable with the body of the milling cutter 1 described by reference to FIGS. 1 to 4. This insert 6 has two main or peripheral cutting edges 10, slightly curved outwardly, two secondary cutting edges 11 and two corner portions 12. The general shape of the insert is that of a parallelogram, if desired of a lozenge for smaller cutting heights, with included angles δ between 40° and 70°, according to the diameter of the cutter and taking account of the penetration angle φ which is desired. Here the included angle is of the order of 45°.

The configuration of the corner portion may vary between a very acute angle and a radius of a maximal value of 8 to 10 mm. In the case of a sharp corner or of a small radius, the insert may comprise a frontal flat between its peripheral cutting edge and its internal secondary edge. A radius of an average value will be tangent to both precited edges, whereas a bigger radius will be completed by a smaller radius between the frontal plan perpendicular to the axis of the tool and the internal secondary edge. FIGS. 8A, 8B and 8C illustrate three possible configurations of the corner portion, respectively, with a big radius R and a smaller radius r, with a sole radius R', and with a frontal flat P.

The cutting insert, as it is shown on FIGS. 5 and 6, further presents a flat central depression 13 connected with the main cutting edges 10 and the secondary cutting edges 11 and with the corner portions 12 through a slope 14 with variable incline, in order to confer to the insert, taking account of its axial rake $\gamma_a$, an effective radial rake $\gamma_r$ which is constant on the milling cutter.

The variations of the slope incline $\omega_A$ to $\omega_F$ of the insert along its cutting edges 10, 11 and of the radius 12 is illustrated on FIGS. 7A to 7F, each representing a schematic partial section along the corresponding lines of FIG. 6. As shown, the slope incline increases along the cutting edge 10 (from $\omega_C$ to $\omega_A$), then decreases along the radius 12 and the cutting edge 11 (from $\omega_A$ to $\omega_D$).

The normal clearance α varies along the cutting edges 10, 11, 12 in such a manner that the clearance angle is constant on the milling cutter, taking account of the axial rake $\gamma_a$; this variation of the clearance angle α corresponds to the variation of the slope incline ω, whereby a wedge angle β of the inserts is resulting which is constant.

Finally, both main edges 10 and their clearance face (or flank) are curved outwardly (convex, bulging), so as to avoid, always taking account the axial rake $\gamma_a$, the geometrical defect of the machined pieces due to the positive axial position of the cutting insert on the milling cutter, and to thus ensure a perfect levelness to the cut surface.

Figure 9:
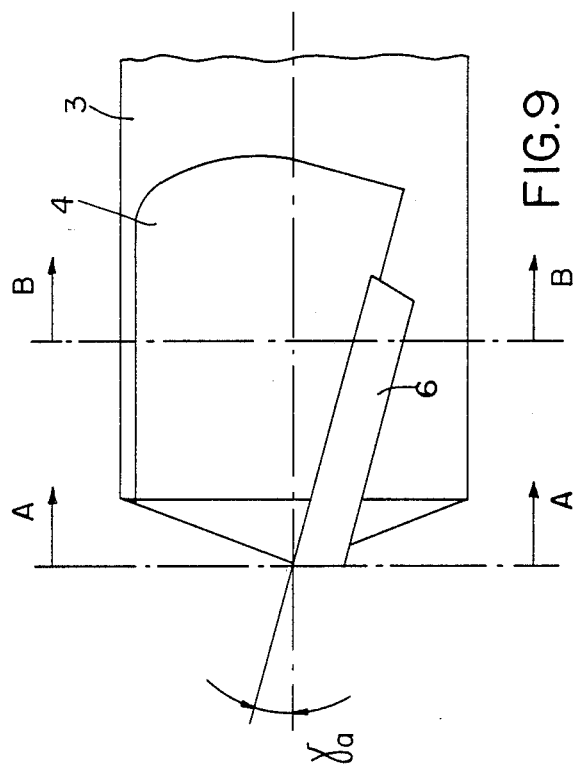
FIG. 9 is a side view of the front part of the cutter of FIG. 1, illustrating only a single blade connected therewith.
Figure 10:
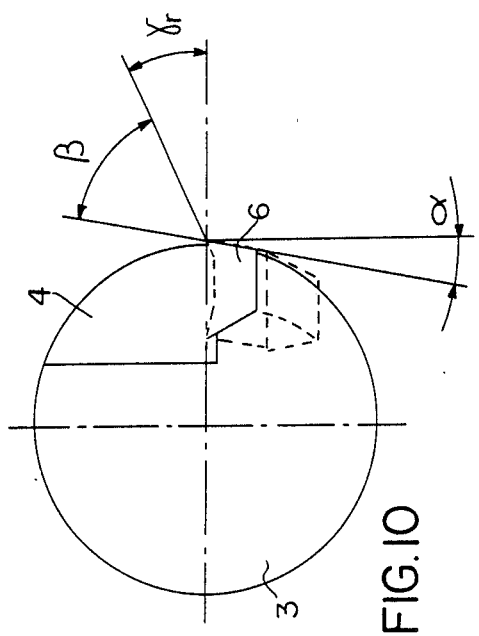
FIGS. 10 and 11 are sectional views taken along lines A—A and B—B of FIG. 9, respectively, illustrating the radial rake, the clearance angle, and the wedge angle at different locations of the insert on the milling cutter.
Figure 11:
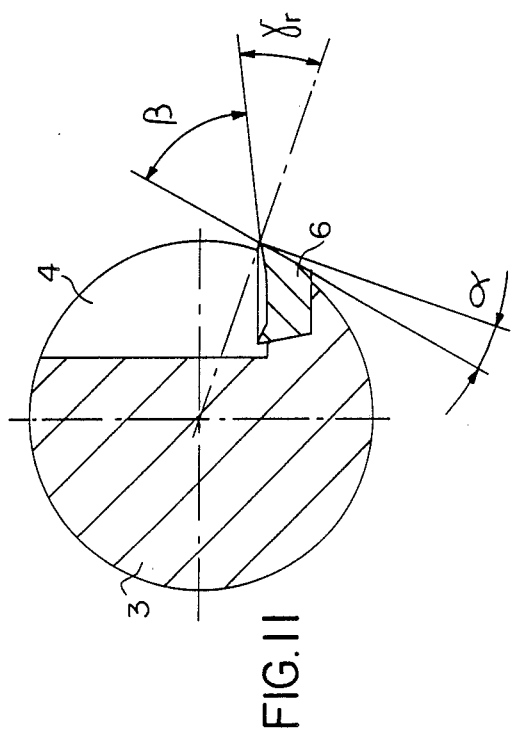

The relationship of the axial rake $\gamma_a$, the radial rake $\gamma_r$, the normal clearance α and the wedge angle β is shown more particularly in FIGS. 9–11. The radial rake $\gamma_r$ of the cutter assembly and the clearance angle are variable along the cutting insert 6, yet constant as regards the assembled milling cutter when the variably angled inserts are connected with the cutter body, owing to the variably shaped configuration of the inserts and oblique indentations of the housing. The wedge angle β of the insert is constant. The insert cutting angle ω varies along the insert and thus corresponds with the radial rake $\gamma_r$.

Accordingly, the radial cutting angle $\gamma_r$ (i.e. the tool side rake) at section A—A is equal to the radial rake $\gamma_r$ at section B—B. Similarly, the clearance angle α is the same at sections A—A and B—B.

Figure 2:
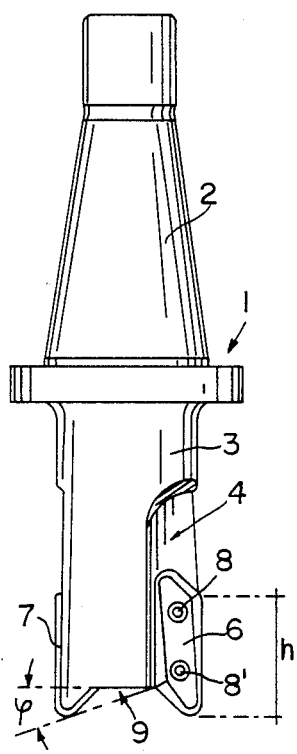
FIGS. 2 and 4 are lateral views, in two different positions, of the milling cutter according to FIG. 1.
Figure 3:
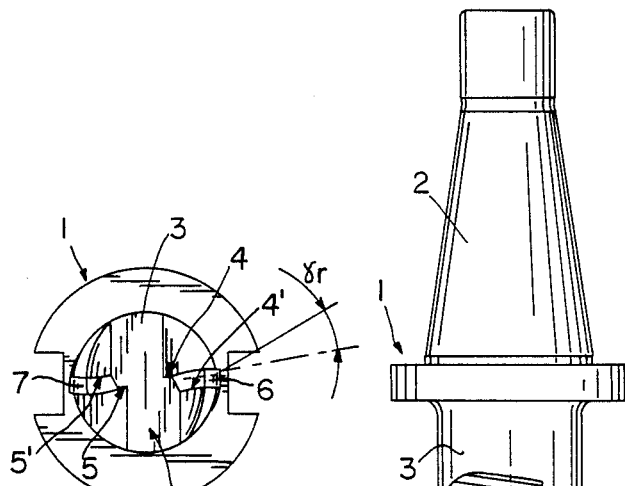
FIG. 3 is an end view of the frontal face thereof.
Figure 4:
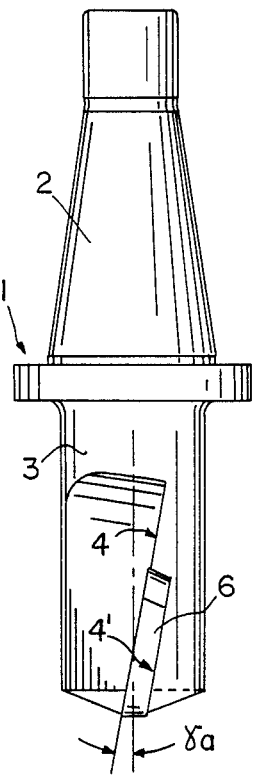

In order to allow its fastening on the body of the milling cutter 1, each cutting insert is bored with openings 15 having partially conical walls (FIG. 5), intended to receive fastening screws, here two screws 8, 8' (FIGS. 1 and 2).

With regards to the known helical milling cutters with brazed cutting plates, the milling cutter with indexable cutting inserts according to the invention especially presents the following advantages:

it allows one to carry out works referred to as pocketing, that is with penetration into material to be machined through the combination of its axial displacement with the movement of the piece to be machined along at least one of the axes of the table;

a sole and the same milling cutter body may receive the choice of cutting inserts having various shapes according to the material to be machined;

it avoids the resharpening operations which are generally tricky and lead to the decrease of the initial diameter; and it also avoids the expensive repair, in case of accidental breakage of an insert, since it is thus sufficient to replace the damaged insert by a new insert.

What is claimed is:

1. A milling cutter having indexable inserts, comprising
   (a) a body including a front portion containing at least two indentations each defining a housing having a bottom surface which defines a positioning angle other than 0° with the longitudinal axis of said body; and
   (b) a cutting insert removably connected with each housing and including a corner portion emerging from a face of said body front portion and a main cutting edge extending beyond and along an external lateral rim of the indentation, said insert having a rake face comprising a flat central depression and a sloped portion having an inclination which varies along its length relative to said flat central depression extending from said flat central depression to said main cutting edge and a clearance face of variable normal clearance along its length forming with said sloped portion a constant wedge angle, wherein the variable incline of the sloped portion and clearance face are selected to coact with the positioning angle to impart to the cutter a constant radial rake and clearance angle.

2. A milling cutter as defined in claim 1, wherein said body comprises two indentations with a housing each receiving an indexable cutting insert.

3. A milling cutter as defined in claim 1, wherein the positioning angle is from 2° to 20°.

4. A milling cutter as defined in claim 1, wherein the sloped portion has an inclination ranging from 3° to 25° with respect to the flat portion.

5. A milling cutter as defined in claim 1, wherein the cutter clearance angle is from 5+ to 20° and the included angle of said insert is from 40° to 70°.

6. A milling cutter as defined in claim 1, wherein said body comprises a frontal clearance having a configuration providing a penetration angle into the material to be machined of 5° to 30° when taking account of the included angle of said cutting inserts.

7. A milling cutter as defined in claim 1, wherein each cutting insert is fixed in a removable manner on said body by means of two screws cooperating with two decentered openings provided in said insert.

8. A cutting insert for use on a milling cutter comprising a cutting element having a parallelogram shape with two long sides of said element defining two main cutting edges and the two short sides of said element defining two secondary cutting edges, the included angle between the main and secondary edges being between 40° and 70°, said element including a flat central depression connected with the main and secondary edges by a sloped portion having an inclination which varies along its length relative to said flat central depression, and a clearance along its length face of variable normal clearance forming with said sloped portion a constant wedge angle, whereby when said element is connected with a cutter, at an acute angle to the axis of the cutter the cutter will have a constant clearance angle and a constant radial rake along its main cutting edge.

9. A cutting insert as defined in claim 8, wherein said main cutting edges are curved outwardly.

* * * * *